United States Patent Office 3,320,066
Patented May 16, 1967

3,320,066
HIGH WET STRENGTH PAPER
Leonid G. Garth, Rochester, N.Y., assignor to Eastman Kodak Company, Rochester, N.Y., a corporation of New Jersey
No Drawing. Filed Sept. 6, 1966, Ser. No. 577,155
13 Claims. (Cl. 96—85)

This application is a continuation-in-part of United States patent application Serial No. 337,718, filed January 15, 1964, and now abandoned.

This invention relates to improved formaldehyde-free wet strength paper involving the use therein of a size comprising a synergistic combination of a certain type of water soluble cationic thermosetting resins and a dialdehyde carbohydrate derivative.

In times past high wet strength papers have been prepared by the use of melamine-formaldehyde or urea-formaldehyde resin as the beater size therein. For many years there have been no formaldehyde-free wet strength resins commercially available for use in paper or resins which functioned effectively at a pH above 5.5. As a consequence various photographic emulsions when coated on high wet strength paper have been adversely affected by the presence of formaldehyde in the paper. Also papers made at an alkaline pH were not effectively wet strengthened. Paper resins had been proposed for employment under alkaline papermaking conditions but the papers obtained have been inferior in wet strength to those made at an acid pH using, for instance, melamine-formaldehyde wet strength resins.

One object of my invention is to provide a system for making formaldehyde-free wet strength paper. Another object of my invention is to provide a system for making wet strength papers under conditions suitable at a wide pH range. A further object of my invention is to provide a system for making wet strength papers using materials having a synergistic effect thus decreasing the amount of wet strength imparting additive necessary to obtain desired wet tensile strength. Other objects of my invention will appear herein.

I have found that papers beater sized with a combination of polyamide-epichlorohydrin resins and certain dialdehyde carbohydrate derivatives have wet tensile strengths equal to or even superior to papers where melamine-formaldehyde resins are used as the sizing. I have found that this combination of wet strength imparting materials exhibits a synergistic effect avoiding the necessity of using considerable amounts thereof to provide paper of high wet tensile strength.

The dialdehyde carbohydrate derivatives which I have found to be useful in my invention are those prepared by the treatment of starch or plant gums with periodic acid which materials are more fully described in Jeffreys and Tabor U.S. Patent No. 3,057,723 and Jeffreys and Tabor and Burness U.S. Patent No. 3,062,652. Various of the oxidized carbohydrate materials listed in those patents are suitable for use as the dialdehyde carbohydrate constituent in accordance with my invention.

The cationic thermosetting polyamide-epichlorohydrin resins employed in conjunction with dialdehyde carbohydrate in accordance with my invention are those described in U.S. Patent No. 2,926,154 or 2,926,116 of Keim. This type resin may be dispersed in the slurry at any time prior to applying to the wire of the paper machine. It is preferable to supply the polyamide-epichlorohydrin resin to the pulp suspension from which the paper is to be prepared prior to the addition of the dialdehyde carbohydrate thereto. The slurry after incorporating these materials is then applied to the wire of the paper machine and the paper formed is dried, all in the conventional manner.

It is usually desirable in preparing paper in accordance with my invention to include therein a small percentage of carboxymethyl cellulose it having been found that the presence thereof contributes to the preparation of the paper and to the properties of the resulting product. Other paper making chemicals may also be incorporated if desired as for example a starch ether (amino alkylated starch) as described in U.S. Patent No. 2,935,436, stearic size, an alum such as aluminum chloride, or other addends or sizes as may be used by the paper maker.

In the making of paper it has been found that the various materials are conveniently used within the following ranges: the polyamide-epichlorohydrin resin—½-2%, based on the dry weight of the cellulose fiber; the dialdehyde carbohydrate or dialdehyde plant gum—¼-2%, based on the weight of the cellulose fiber; the carboxymethyl cellulose—0.25-1%, based on the weight of the cellulose fiber; the cationic starch (starch ether)—0-3%, based on the weight of the cellulose fiber.

The paper in accordance with my invention may be conveniently prepared by subjecting paper making fibers such as high alpha-cellulose content wood pulp, cotton linters, rag fibers, rope fibers, regenerated cellulose fibers, partially acetylated cellulose, and the like to a beating operation in water to form a dilute slurry. It is to this dilute slurry particularly after some beating has taken place to obtain the desired slowness that the paper making chemicals are added. The pulp may be desirably run through a Jordan machine and the chemicals may be added then or at some point between the Jordan machine and the headbox. Aluminum chloride or aluminum sulfate is ordinarily supplied to the pulp slurry in sufficient amount to give the desired pH. However, as the materials used in accordance with my invention are effective over a wide pH range the use of the aluminum chloride or sulfate may be accompanied by the use of ammonium hydroxide to impart a pH on the alkaline side if considered desirable.

The stearic size referred to may be prepared by the paper maker by the method with which he is familiar. For instance, this size may be prepared by mixing together sodium hydroxide and commercial stearic acid, or a synthetic stearic size such as in the form of an emulsion may be applied to the pulp slurry, if considered desirable in the paper making operation.

After the paper is formed it may be tub sized with any desired tub sizing material as for example a gelatin sizing composition as known in the art. Other finishing steps such as calendering or the like may be employed for preparing paper having good surface characteristics as well as good tensile strength.

The paper made in accordance with my invention is particularly adapted for use for photographic purposes such as base to which is applied a photographic emulsion layer desirably over a baryta coating on the paper. However, my invention is not restricted to this particular use but may be employed in the manufacture of paper for toweling, paper bags, tissue, map paper or the like. In fact any paper which might be adversely affected by water or excessive moisture might desirably be sized with a mixture of a polyamide-epichlorohydrin resin and a dialdehyde carbohydrate in accordance with the invention.

The following examples illustrate my invention.

*Example 1*

An aqueous slurry was prepared using 3000 pounds of high alpha-cellulose sulfite wood pulp fiber. Dye was added followed by the addition of stearic size. Also added was 50 pounds of aminoalkylated starch and then aluminum chloride sufficient to impart the desired pH to the mass. Separate portions of this slurry were taken. To one portion was added (based on dry fiber weight) 1% of polyamide-epichlorohydrin resin of the type deibed in the Kein patents referred to above and 2% of
ldehyde starch. The slurry was coated out onto the
e of a Fourdrinier, and was calendered. The result-
paper was found to have a wet tensile strength of 34
ich is approximately the same as that of a paper of like
d sized with melamine-formaldehyde resin. Another
nple of pulp was sized with 1% polyamide-epichloro-
drin and ¾% dialdehyde starch in that order, the
oportions being based on the weight of the cellulose
er. In this run ½% of carboxymethyl cellulose was
o used. The wet tensile strength of paper prepared
refrom was greater than that of any other papers tested
ich other papers had been prepared using other wet
ength imparting materials than the mixture of poly-
ide-epichlorohydrin resin and dialdehyde starch.

*Example 2*

2500 pounds of refined wood pulp fiber having a high
pha-cellulose content was slurried and added to the
rry was ½% of carboxymethyl cellulose, 2% of amino
kylated starch known as cationic starch, gelatin, dyes
aric size and an amount of aluminum chloride to give
pH at which good paper making conditions prevail.
portion of the slurry was taken and added thereto,
ter first beating and processing, was ½% of poly-
nidecationic thermosetting resin as referred to herein
d then ¾% of dialdehyde starch (all percentages being
sed on the weight of dry fiber). Paper was prepared
om the slurry by running it out onto the wire of the
per machine followed by calendering. A paper was
tained having a wet tensile strength of 37. Other wet
rength imparting agents were tested in this manner but
e wet tensile strengths were somewhat inferior in the
se of every other material tested. The amounts of the
et strength imparting additives to use is determined to
me extent by the weight of the stock being prepared;
r instance, in preparing a double weight stock quanti-
es of additive on the order of 0.3% cationic starch, 1%
f polyamide-epichlorohydrin resin and ¾% of dialde-
yde starch would be quite satisfactory. If however the
aper is to be of the single weight type, higher amounts
f the polyamide-epichlorohydrin resin and the dialde-
yde carbohydrate are desirable to give optimum wet
trength. Some of the dialdehyde materials prepared by
xidizing plant gums with periodic acid to obtain the de-
ired materials are for instance, the dialdehydes of gum
cacia, gum tragacanth, guar gum, mesquite gum, alginic
cid, damson gum or hemicellulose gums such as pectins
r xylans. These various materials may be classified as
olyuronides which have been subjected to a controlled
eriodate oxidation whereby secondary alcohol groups
n the gum were converted to aldehyde groups.

When other paper making fibers such as cotton linters,
efined rag fibers, rope fibers, partially acetylated cellulose
ibers, regenerated cellulose fibers and mixtures thereof
(including mixtures with wood pulp fiber) are substituted
or the refined wood pulp fiber in processes such as those
llustrated by Examples 1 and 2 above, similar improved
wet strength paper is obtained.

Paper as prepared by the procedure described in Ex-
ample 2 was supplied with a baryta coating and over the
dried baryta coating was applied a layer of a gelatin-
silver halide photographic emulsion. A photographic
paper of good qualities and unusually resistant to the ef-
fects of water was thereby obtained.

What is claimed is:
1. A composition of matter comprising paper-making fibers dispersed in water to which has been added a polyamide-epichlorohydrin resin and a dialdehyde carbohydrate derivative.
2. A composition of matter comprising paper-making fibers dispersed in water to which has been added a polyamide-epichlorohydrin resin and a dialdehyde carbohydrate derivative; said paper-making fibers being selected from the group consisting of rag fibers, rope fibers, wood pulp fibers, cotton linters, partially acetylated cellulose fibers, regenerated cellulose fibers and mixtures thereof.
3. A composition of matter comprising an aqueous suspension of wood pulp fibers in water, a polyamide-epichlorohydrin resin and dialdehyde starch.
4. A composition of matter comprising an aqueous suspension of wood pulp fibers in water, a polyamide-epichlorohydrin resin and dialdehyde plant gum.
5. Paper containing therein the following sizing materials (1) polyamide-epichlorohydrin resin size, and (2) a dialdehyde carbohydrate derivative.
6. Paper containing therein the following sizing materials (1) polyamide-epichlorohydrin resin size, (2) a dialdehyde carbohydrate derivative, and (3) cationic starch.
7. Paper containing therein the following sizing materials (1) polyamide-epichlorohydrin resin size, (2) a dialdehyde carbohydrate derivative and (3) carboxymethyl cellulose.
8. Paper containing therein the following sizing materials (1) polyamide-epichlorohydrin resin size and (2) dialdehyde starch.
9. Paper containing therein the following sizing materials (1) polyamide-epichlorohydrin resin size and (2) dialdehyde plant gum.
10. Paper containing the following sizing materials: (1) polyamide-epichlorohydrin resin size, (2) dialdehyde starch, and (3) carboxymethyl cellulose.
11. Photographic paper composed of paper base containing the following sizing materials: (1) polyamide-epichlorohydrin resin size, (2) a dialdehyde carbohydrate derivative, which paper base has a photosensitive layer thereon.
12. Photographic paper composed of paper base containing the following sizing materials: (1) polyamide-epichlorohydrin resin size, and (2) dialdehyde starch, which paper base has a photosensitive layer thereon.
13. Photographic paper composed of paper base containing the following sizing materials: (1) polyamide-epichlorohydrin resin size, and (2) dialdehyde plant gum, which paper base has a photosensitive silver halide emulsion layer thereon.

No references cited.

NORMAN G. TORCHIN, *Primary Examiner.*
RONALD SMITH, *Examiner.*